United States Patent [19]
Be et al.

[11] Patent Number: 6,106,607
[45] Date of Patent: Aug. 22, 2000

[54] COMPOSITION FOR HYDROPHOBING GYPSUM AND METHODS FOR THE PREPARATION AND USE THEREOF

[75] Inventors: Anh Be; Paul David Fisher, both of Midland, Mich.

[73] Assignee: Dow Corning Corporation, Midland, Mich.

[21] Appl. No.: 09/393,309

[22] Filed: Sep. 10, 1999

[51] Int. Cl.[7] ............................ C04B 11/00; C04B 24/02; C04B 24/12; C09K 3/18
[52] U.S. Cl. ............................ 106/781; 106/3; 106/287.1; 106/287.11; 106/287.13; 106/287.14; 106/287.15; 156/41; 156/42; 264/333
[58] Field of Search .......................... 106/287.1, 287.11, 106/287.13, 287.14, 287.15, 781, 3; 156/41, 42; 264/333

[56] References Cited

U.S. PATENT DOCUMENTS

| | | | |
|---|---|---|---|
| 4,620,878 | 11/1986 | Gee | 106/287.15 |
| 4,975,122 | 12/1990 | Parkinson et al. | 106/727 |
| 5,110,684 | 5/1992 | Cooper | 428/447 |
| 5,518,775 | 5/1996 | Kosal et al. | 427/387 |
| 5,567,347 | 10/1996 | Kosal et al. | 252/8.62 |
| 5,665,471 | 9/1997 | Kosal et al. | 428/378 |
| 5,776,245 | 7/1998 | Thomas | 106/781 |
| 5,855,667 | 1/1999 | Thomas | 106/781 |

*Primary Examiner*—Anthony Green
*Attorney, Agent, or Firm*—James L. De Cesare

[57] ABSTRACT

A water repellent composition for gypsum containing masonry materials is disclosed. The composition contains as organohydrogensiloxane and polyvinyl alcohol, the combination of which provides unexpectedly high water repellency.

10 Claims, No Drawings

COMPOSITION FOR HYDROPHOBING GYPSUM AND METHODS FOR THE PREPARATION AND USE THEREOF

FIELD OF THE INVENTION

This invention relates to a composition for rendering masonry materials water repellent. More specifically, this invention relates to a composition for rendering gypsum containing masonry materials water repellent. This invention further relates to methods for preparing and using the composition.

BACKGROUND OF THE INVENTION

'Masonry' means any porous inorganic substrate, such as building materials. Gypsum is calcium sulfate dihydrate having the formula $CaSO_4 2H_2O$. Masonry materials containing gypsum include gypsum wallboard and gypsum fiberboard. When calcium sulfate dihydrate is heated above 110° C., moisture is evolved and the resulting product is termed plaster of paris or stucco. When plaster of paris is mixed with water, it rehydrates and sets to a solid mass within a few minutes. Gypsum wallboard can be produced by layering slabs of the solid mass between sheets of fabric or tough paper.

Alternatively, gypsum wallboard can be produced continuously by pouring a mixture comprising gypsum and water onto a conveyer belt and allowing the mixture to set before cutting boards to length and drying. Gypsum blocks, moldings, and the like can be prepared by forming a mixture comprising gypsum and water in a mold or casting to provide products with desired shapes. Drying times vary depending on the bulk of the mixture to be dried.

Masonry materials containing gypsum may further comprise organic, mineral or glass fibers to modify the physical properties of the materials. Suitable organic fibers include cellulosic fibers and paper.

Gypsum wallboard and other masonry materials containing gypsum have little resistance to water. Water repellence is an important factor in masonry construction. Moisture absorption in masonry can cause or contribute to problems such as expansion, shrinkage, cracking, staining, mildew, lowered resistance to freezing and thawing, chemical attack, corrosion of reinforcing steel, and damage to structures from settling. Therefore, it is an object of this invention to provide a water repellent composition for masonry materials containing gypsum.

Attempts have been made in the past to improve the water resistance of gypsum containing masonry materials by coating the materials with water repellent surface coatings and by incorporation of water resistant materials into the mixtures used to prepare the materials. Such water resistant materials include metallic soaps, asphalts, waxes, and resins. However, waterproofing by surface coating the masonry materials is insufficient because water resistance is provided only at the surface and the bulk of the substrate is left untreated. Therefore, it is a further object of this invention to provide a water repellent composition that can be uniformly dispersed in a gypsum containing masonry material.

Water repellent compositions that can be dispersed in a masonry material are exemplified by the following: U.S. Pat. No. 4,975,122 discloses a slurry of water, gypsum, and a composition comprising an admixture of an organic amine and an SiH containing siloxane.

U.S. Pat. No. 5,110,684 discloses a method of rendering masonry architectural building materials water repellent by incorporating an additive into the materials. The additive comprises a mixture of a water soluble silane coupling agent and an aqueous emulsion of a siloxane fluid. The silane coupling agent is an aminofunctional silane.

U.S. Pat. No. 5,855,667 discloses a gypsum mixture containing a hydrophobic additive. The mixture is prepared by adding gypsum and two alkoxysilanes to water. Thereafter, the gypsum mixture is formed into desired shapes and dried.

However, no polyvinyl alcohols are disclosed in U.S. Pat. Nos. 4,975,122, 5,110,684, 5,855,667, or 5,776,245. U.S. Pat. No. 5,776,245 discloses a method for hydrophobing gypsum. The method comprises preparing an aqueous gypsum mixture having a hydrophobic additive dispersed therein. The hydrophobic additive contains non-emulsified ingredients including an alkoxysilane and a polysiloxane. This patent teaches that the use of emulsified ingredients diminishes the hydrophobic properties in the gypsum mixture.

However, all of the gypsum containing materials described above suffer from the drawback that water repellence is still insufficient for some applications. Therefore, it is an object of this invention to produce a composition for rendering gypsum containing masonry materials water repellent. It is a further object of this invention to provide water repellent gypsum containing materials having superior water repellency to materials known in the art.

By using an organohydrogensiloxane emulsion, better distribution of the organohydrogensiloxane in the gypsum matrix can be obtained. Without wishing to be bound by theory, the applicants believe that the mechanism for increased water repellency is hydrogen bonding of the organohydrogensiloxane and the water within the gypsum matrix. The aminofunctional compounds catalyze the organohydrogensiloxane emulsion polymer into a siloxane resin.

SUMMARY OF THE INVENTION

This invention relates to a composition that can be used to render gypsum containing masonry materials water repellent. The composition comprises an emulsion and an aminofunctional compound. The emulsion comprises an organohydrogensiloxane, polyvinyl alcohol, and a carrier. The aminofunctional compound comprises an aminosilane or an organic amine. The combination of the polyvinyl alcohol and the aminofunctional compound provides a synergistic effect in that this composition imparts unexpectedly high water repellency to gypsum containing masonry materials.

BRIEF DESCRIPTION OF THE DRAWINGS

DETAILED DESCRIPTION OF THE INVENTION

This invention relates to a water repellent composition. The composition comprises:
  (I) an emulsion comprising
    (A) an organohydrogensiloxane,
    (B) water, and
    (C) polyvinylalcohol; and
  (II) an aminofunctional compound.

Component (I) is an emulsion having a discontinuous phase comprising component (A) and a continuous phase comprising component (B). Component (A) is an organohydrogensiloxane. The organohydrogensiloxane can be linear, branched, or cyclic. Suitable organohydrogensiloxanes comprise units of the formulae $R_2SiO_{2/2}$ and $RHSiO_{2/2}$, wherein each R is independently a monovalent hydrocarbon group. Suitable monovalent hydrocarbon groups include alkyl groups such as methyl, ethyl, propyl, and butyl and aryl groups such as phenyl, tolyl, and xylyl. Suitable organohydrogensiloxanes known in the art and are commercially available. Examples of suitable organhydrogensiloxanes are disclosed in U.S. Pat. No. 5,110,684, which is hereby incorporated by reference in its entirety.

Preferably, the organohydrogensiloxane has the formula:

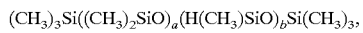

wherein a is 0 to 100, and b is 2 to 100. More preferably, a is 0 and b is 40 to 80.

The emulsion typically contains 20 to 60 weight % of the organohydrogensiloxane, preferably 40 to 50 weight %.

Component (B) is water. The amount of component (B) in the emulsion is typically 15 to 79, preferably 40 to 60 weight percent.

Component (C) is a polyvinyl alcohol (PVA). PVA has the general formula

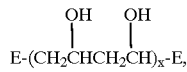

wherein E may be, e.g., $CH_3, CH_2CH_3, (CH_2)_2CH_3$, and x, which denotes the degree of polymerization (DP), may be, e.g., 1 to 1000.

Polyvinyl alcohol can be prepared by polymerization of vinyl acetate followed by hydrolysis of the resulting poly (vinyl acetate). Polyvinyl alcohols are known in the art and are commercially available. For example, POLYSOL J® is a solution of low viscosity polyvinyl alcohol available from ICI Surfactants. The amount of polyvinyl alcohol in the emulsion is typically 1 to 25 weight %, preferably 3 to 6 weight %.

The emulsion may further comprise optional components, as described in U.S. Pat. No. 5,110,684, incorporated herein by reference. For instance, the emulsions may also contain freeze—thaw additives such as polyglycols, representative of which are ethylene glycol, propylene glycol, butylene glycol, mixtures, and copolymers thereof. Other techniques for preparing emulsions are applicable, for instance as shown in U.S. Pat. No. 4,620,878. The '878 patent also contains details of other suitable surfactants that may be employed.

Component (I) the emulsion can be prepared by mixing the organohydrogensiloxane with the polyvinyl alcohol and water. The resulting mixture can be stirred and homogenized to produce an oil in water type emulsion. Typically, the organohydrogensiloxane comprises 40 to 50 weight % of the emulsion, the water comprises 44 to 57 weight % of the emulsion, and the polyvinyl alcohol comprises 3 to 6 weight % of the emulsion. Methods for preparing emulsions are known in the art. For example, U.S. Pat. No. 5,110,684 discloses a method for preparing an aqueous emulsion of a siloxane fluid, a surfactant, and water.

The water repellent composition of this invention typically comprises from 40 to 80 weight % of component (I) and 20 to 60 weight % of component (II).

Component (II) is an aminofunctional compound selected from the group consisting of aminosilanes, organic amines, and combinations thereof. Preferably, the aminofunctional compound is an organic amine.

Suitable organic amines are known in the art and are commercially available. Examples of suitable organic amines include alkyl amines, ether amines and the salts thereof. Examples of suitable organic amines are disclosed in U.S. Pat. No. 4,975,122 (at col. 4–5), which is hereby incorporated by reference for the purpose of providing examples of organic amines.

Suitable aminosilanes are known in the art and are commercially available. Examples of suitable aminosilanes are disclosed in U.S. Pat. No. 5,110,684 (at col. 9) and U.S. Pat. No. 5,776,245, which is hereby incorporated by reference for the purpose of providing examples of aminosilanes.

Preferably, the aminosilane is selected from the group consisting of n-(2-aminoethyl)-3-aminopropyltrimethoxysilane, aminopropyl, methyldiethoxysilane, aminopropyltriethoxysilane, aminopropyltrimethoxysilane, and aminoethylaminoisopropyl, methyldimethoxysilane.

This invention further relates to a method for rendering substrates water repellent. The method comprises incorporating the water repellent composition into the substrate. Suitable substrates include masonry materials, preferably masonry materials comprising gypsum. For example, a slurry can be prepared by mixing a composition comprising gypsum and water. The water repellent composition comprising (I) the emulsion and (II) the aminofunctional compound can be added to the slurry and mixed until the resulting aqueous gypsum mixture has the water repellent composition uniformly dispersed therein. Fibers such as organic, mineral, or glass fibers may be added to the slurry to modify the physical properties of the resulting substrate. Suitable organic fibers include cellulosic fibers and paper.

After mixing, the slurry can be formed into a desired shape, for example by pressing, casting, or molding. The slurry is dried to remove the water. Drying can be carried out under ambient conditions, or by the application of mild heat, vacuum, or both. The organohydrogensiloxane then can be cured at ambient or elevated temperature, thereby forming a resin that renders the substrate water repellent.

In one embodiment of this invention, gypsum board can be produced. This method comprises depositing a slurry comprising gypsum, water, and the composition of this invention between liners, pressing the slurry to a desired thickness, and thereafter drying the slurry to form a board. Lightweight gypsum board can be prepared by adding an aerated foam to the gypsum, thereby causing the production of air spaces in the slurry. Suitable methods for preparing water repellent substrates are disclosed in U.S. Pat. No. 5,855,667, which is hereby incorporated by reference.

The water repellent composition of this invention is typically added in an amount such that the substrate will contain 0.1 to 0.8 weight % based on solids weight of the water repellent composition, based on the dry weight of the substrate.

EXAMPLES

These examples are intended to illustrate the invention to those skilled in the art and should not be interpreted as limiting the scope of the invention set forth in the claims.

Reference Example 1

Gypsum block samples were prepared by the following method. A slurry of gypsum, gypsum fiber, or both, was prepared with water. A siloxane containing material and an aminofunctional compound were added and mixed for 1 minute. The resulting mixture was formed into blocks.

Excess water was removed by either vacuum filtration, convection heat, or both.

After removal of the water, the gypsum blocks were cured. After cure, the gypsum blocks were soaked in a water bath with 1 inch of water above the top of the gypsum block for a desired length of time. Percent water pickup after 30 minutes was recorded as weight percent relative to the dry weight of the gypsum block.

Examples 1 and 2

A gypsum block was prepared by the method of Reference Example 1. The block was cured for 30 minutes at room temperature and for an additional 45 minutes in an oven at a temperature of 85° C.

The siloxane containing material was an aqueous emulsion of an organohydrogensiloxane with polyvinyl alcohol. The organohydrogensiloxane had the formula $(CH_3)_3Si(H(CH_3)SiO_{2/2})_bSi(CH_3)_3$, wherein b was 40 to 80. The aminofunctional compound was an organic amine. The formulations are in Table 1, and the results as percent water pickup are in Table 2. Percent water pickup was 4.5%.

Comparative Example 1

A gypsum block was prepared by the method of Reference Example 1, except that the siloxane containing material was a methylhydrogensiloxane fluid, and the aminofunctional compound was an aminosilane. The block was cured for 30 minutes at room temperature and for 45 additional minutes in an oven at 85° C. The block was cured for an additional 24 hours at room temperature, and soaked again for 30 minutes. The formulation is in Table 1, and the results as percent water pickup are in Table 2.

Comparative Example 2

A gypsum block was prepared by the method of Reference Example 1, except that the siloxane containing material was a methylhydrogensiloxane fluid. The formulation is in Table 1, and the results as percent water pickup are in Table 2.

Comparative Example 3

A gypsum block was prepared by the method of Reference Example 1, except that the siloxane containing material was an emulsion of a methylhydrogensiloxane fluid. The formulation is in Table 1, and the results as percent water pickup are in Table 2.

TABLE 1

Formulations (weight parts)

| | Example 1 | Example 2 | Comparative Example 1 | Comparative Example 2 | Comparative Example 3 |
|---|---|---|---|---|---|
| Gypsum/fiber | 100 | 100 | 100 | 100 | 100 |
| water | 571 | 571 | 571 | 571 | 571 |
| methylhydrogensiloxane emulsion | 0.6 | 0.5 | 0 | 0 | 0.8 |
| methylhydrogensiloxane fluid | 0 | 0 | 0.6 | 1.0 | 0 |
| organic amine | 0.3 | 0.3 | 0 | 0 | 0 |
| aminosilane | 0 | 0 | 0.3 | 0 | 0 |

TABLE 2

Per Cent Water Pickup (weight %)

| | After 30 min at room temp. (RT) and 45 min. in an oven | |
|---|---|---|
| Example 1 | 4.5% (no additional RT cure time) | |
| Example 2 | 3.6% (no additional RT cure time) | |
| Comparative Example 1 | 30% | 4.8% (additional 24 hours RT cure) |
| Comparative Example 2 | 28% | 37% (additional 96 hours RT cure) |
| Comparative Example 3 | 34.9% | |

Examples 1 and 2, and comparative examples 1, 2 and 3 show that using an emulsion of the organohydrogensiloxane provides better water repellency to gypsum containing substrates than using a neat organohydrogensiloxane fluid. Furthermore, the comparative testing with additional cure times demonstrate the utility of the aminofunctional compound in the formulation.

We claim:

1. A method for preparing a water repellent substrate comprising:
    (1) mixing a water repellent composition with a slurry comprising water and gypsum to form a product, and
    (2) drying the product of step (1), wherein the water repellent composition comprises:
        (I) an emulsion comprising:
            (A) 20–60 percent by weight of an organohydrogensiloxane,
            (B) 15–79 percent by weight of water, and
            (C) 1–25 percent by weight of polyvinyl alcohol; and
        (II) an aminofunctional compound selected from the group consisting of aminosilanes and organic amines.

2. The method of claim 1 wherein the product of step (1) is formed into a shape before drying.

3. The method of claim 2 wherein the product of step (1) is formed into gypsum board by depositing the product between liners and pressing the product to a thickness before drying.

4. The method of claim 3 wherein the slurry further comprises an optional component selected from the group consisting of an aerated foam and a fiber.

5. The method of claim 2 wherein the product of step (1) is formed into a shape by molding or casting before drying.

6. The method of claim 1 wherein the method further comprises (3) heating to cure the product of step (2).

7. A water repellent composition comprising:
    (I) an emulsion comprising:
        (A) 20–60 percent by weight of an organohydrogensiloxane,
        (B) 15–79 percent by weight of water, and
        (C) 1–25 percent by weight of polyvinyl alcohol; and
    (II) an aminofunctional compound selected from the group consisting of aminosilanes and organic amines.

8. The composition of claim 7 wherein the organohydrogensiloxane has the formula $$(CH_3)_3Si((CH_3)_2SiO)_a(H(CH_3)SiO)_bSi(CH_3)_3$$

where a is 0 to 100 and b is 2 to 100.

9. The composition of claim 7 wherein the aminofunctional compound is an aminosilane selected from the group consisting of n-(2-aminoethyl)-3-aminopropyltrimethoxysilane, aminopropylmethyldiethoxysilane, aminopropyltriethoxysilane, aminopropyltrimethoxysilane, and aminoethylaminoisopropylmethyldimethoxysilane.

10. The composition of claim 9 wherein the aminofunctional compound is an organic amine selected from the group consisting of alkyl amines and ether amines.

* * * * *